United States Patent
Stenson et al.

(10) Patent No.: US 11,790,604 B2
(45) Date of Patent: Oct. 17, 2023

(54) MAPPING DATA TO GENERATE SIMULATION ROAD PAINT GEOMETRY

(71) Applicant: GM Cruise Holdings LLC, San Francisco, CA (US)

(72) Inventors: Richard Stenson, Miami, FL (US); Joel Gross, Irvine, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/550,243

(22) Filed: Dec. 14, 2021

(65) Prior Publication Data

US 2023/0186560 A1   Jun. 15, 2023

(51) Int. Cl.
*G06T 17/05* (2011.01)
*G06T 17/20* (2006.01)
*G06T 19/20* (2011.01)

(52) U.S. Cl.
CPC .............. *G06T 17/05* (2013.01); *G06T 17/20* (2013.01); *G06T 19/20* (2013.01); *G06T 2207/10028* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 6,622,085 | B1* | 9/2003 | Amita | G09B 29/00 340/995.14 |
| 2014/0289663 | A1* | 9/2014 | Zhang | G06T 15/02 715/771 |
| 2016/0078644 | A1* | 3/2016 | Yue | G09G 5/36 382/199 |
| 2018/0370567 | A1* | 12/2018 | Rowell | B62D 15/0295 |
| 2020/0074266 | A1* | 3/2020 | Peake | G06F 18/2411 |
| 2020/0098135 | A1* | 3/2020 | Ganjineh | G06F 16/583 |
| 2020/0312007 | A1* | 10/2020 | Liu | G06T 15/04 |
| 2021/0366150 | A1* | 11/2021 | Mittal | G01C 21/3837 |
| 2022/0130296 | A1* | 4/2022 | Kamiya | B60K 35/00 |

* cited by examiner

*Primary Examiner* — Kent W Chang
*Assistant Examiner* — Jonathan M Cofino
(74) *Attorney, Agent, or Firm* — Novak Druce Carroll LLP (57) ABSTRACT

The disclosed technology provides solutions for generating accurate virtual representations of real-world environments. A process of the disclosed technology can include steps for: receiving map data corresponding to a geographic region, receiving image data for at least a portion of the geographic region that includes one or more images of road paint, and rendering one or more road paint mesh objects corresponding to the one or more images of the road paint, wherein a shape of the one or more road paint mesh objects is based on the map data. In some aspects, the process can further include generating a virtual environment corresponding to the geographic region that includes the one or more road paint mesh objects.

20 Claims, 5 Drawing Sheets

MAPPING DATA TO GENERATE SIMULATION ROAD PAINT GEOMETRY

BACKGROUND

1. Technical Field

The disclosed technology provides solutions for improving the accuracy of virtual representations of real-world locations and in particular, for capturing and using real-world road paint imaging to facilitate generation of road paint geometry for virtual environments, for example, that can be used to simulate autonomous vehicle (AV) behaviors.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LIDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One way to improve various aspects of autonomous vehicle (AV) performance, such as navigation and routing functions, is to simulate AV operations for various driving scenarios. The simulation of such scenarios can be performed in a virtual environment, such as a three-dimensional (3D) virtual environment that can be used to generate synthetic AV sensor data. Because the goal of improving AV operations is to improve AV safety and performance in real-word environments, it is beneficial to accurately replicate the characteristics of real-world locations when generating virtual environments used for simulation.

Aspects of the disclosed technology address the foregoing need by providing solutions for accurately replicating real-world road paint in virtual environments. In some approaches, the disclosed technology provides a novel process for capturing image data for a geographic location, and for using real-world road paint images extracted from the image data to generate road paint geometry (referred to herein as road paint mesh objects) for use in virtual environments. As discussed in further detail below, AV performance for specific locations can be greatly enhanced by improving the simulation of the road paint in the corresponding virtual environments.

Figure 1:
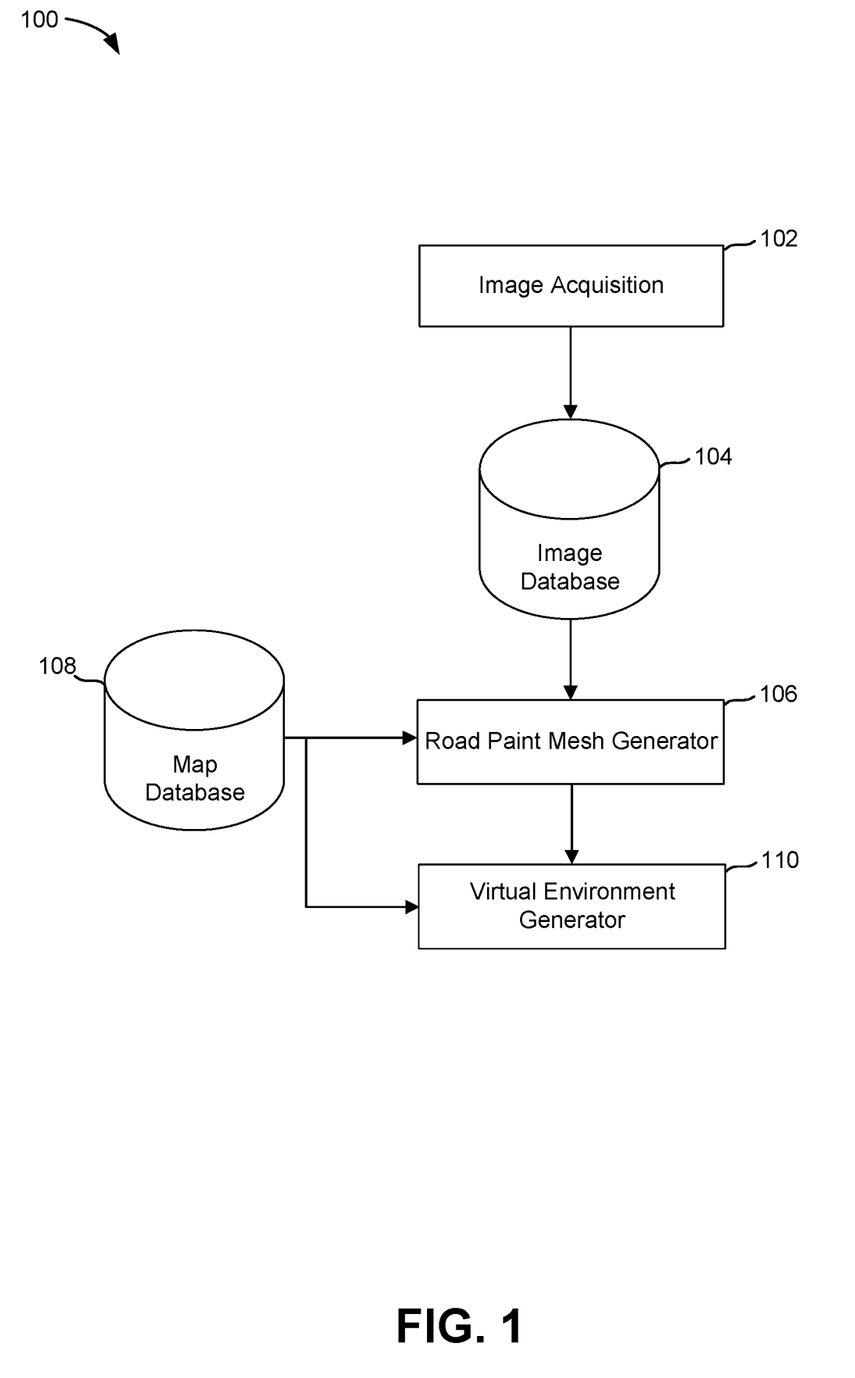
FIG. 1 conceptually illustrates an example system for rendering a virtual environment using road paint geometry generated from real-world road paint imaging, according to some aspects of the disclosed technology.

FIG. 1 conceptually illustrates an example system 100 for rendering a virtual environment using road paint geometry generated from real-world road paint imaging. System 100 includes an image acquisition process 102 that includes the capture of one or more images for a particular geographic location (e.g., San Francisco). In some embodiments, image acquisition 102 may be performed by an autonomous vehicle configured to capture image data in a geographic region. In some aspects, image acquisition 102 can include the association of geolocation metadata (e.g., geolocation coordinates) with the captured images. Associations with other types of metadata can also be performed, such as metadata indicating a time of day, time of year (date), and/or any other suitable metadata.

In some aspects, image acquisition 102 can include image captures of a road (e.g., street, highway, etc.) using an image capture device such as a camera or a light detection and ranging (LIDAR) sensor. In some cases, the image capture device may be mounted on a vehicle, an autonomous vehicle, an airplane, a drone, a helicopter, or a satellite. In some embodiments, the image capture device can be positioned to face in a downward direction to capture images of the road. In some cases, the image data can include one or more two-dimensional textures of the road. In some aspects, the image data can be stored on one or more storage devices such as image database 104.

In some cases, system 100 can include a road paint mesh generator 106. In some instances, road paint mesh generator 106 can be configured to generate road paint mesh objects (e.g., road paint geometry) based on image data that includes images of road paint retrieved from image database 104. In some implementations, road paint mesh generator 106 can process the image data to identify portions of an image that correspond to road paint. In some cases, road paint mesh generator 106 can use map data obtained from map database 108 to associate road paint mesh objects with geographic locations on a map.

In some examples, road paint mesh generator 106 can identify portions of the image that correspond to road paint based on image intensity data. For example, road paint mesh generator 106 can process image data (e.g., captured with LIDAR sensors) to determine an intensity value associated with one or more pixels. In some cases, pixels corresponding to road paint can have a relatively high intensity value (e.g., due to retro reflective properties of road paint) as compared to the intensity value of pixels corresponding to asphalt. In one illustrative example, pixels corresponding to road paint can have an intensity value of 128 or higher and pixels corresponding to asphalt can have an intensity value of 5 or lower (e.g., on scale of 0 to 255).

In some embodiments, road paint mesh generator 106 can rasterize image data (e.g., from image database 104) to identify road paint. In some aspects, road paint mesh generator 106 can process each pixel from the image data to form road paint mesh objects. In some cases, each pixel can be used to generate a corresponding road paint mesh object. In some aspects, a road paint mesh object may correspond to multiple pixels. For example, road paint mesh generator 106 can identify a group of pixels corresponding to road paint for a sidewalk and generate road paint geometry (e.g., one or more polygons) that can be used to simulate the road paint for the sidewalk in a virtual environment.

In some cases, road paint mesh generator 106 can use data from map database 108 to correlate a road paint mesh object with a geographic location on a map. For example, a road paint mesh object can be associated with three dimensional coordinates that can be used to map the road paint mesh object to a spatial grid (e.g., in a simulated environment). In some aspects, road paint mesh generator 106 can use map topography data to generate road paint mesh objects having geometric properties that correspond to the topography of a corresponding geographic location. For example, topography data (e.g., height map data) may be used to generate a road paint mesh object that fits or complements the contour or curvature of a road.

In some embodiments, road paint mesh generator 106 can generate road paint mesh objects having a height or elevation that can be used to simulate the thickness of road paint (e.g., thickness of road paint as applied to asphalt). In some examples, the height of road paint mesh objects can be adjusted (e.g., increased or decreased) by road paint mesh generator 106. In some cases, the height of road paint mesh objects may improve a virtual environment used for testing or simulating behavior of an autonomous vehicle. For example, virtual environment generator 110 can create a simulated real-world environment that includes road paint geometry having a height that may trigger one or more sensors on an autonomous vehicle.

In some cases, road paint mesh generator 106 may be used to alter the appearance of road paint in order to implement different simulation test scenarios. For example, road paint mesh generator 106 can be used to simulate fading or lightening of road paint. In some cases, road paint mesh generator 106 can be used to simulate sullied road paint. In some instances, road paint mesh generator 106 can be used to modify the edges of road paint (e.g., provide a feathering effect). In some cases, road paint mesh generator 106 can alter the appearance of road paint by modifying the number of polygons used in a road paint mesh object.

In some aspects, system 100 can include a virtual environment generator 110. In some cases, virtual environment generator 110 can be used to test the operation of an autonomous vehicle. In some examples, virtual environment generator 110 can render a simulated real-world environment that uses road paint mesh objects (e.g., from road paint mesh generator 106) to simulate road paint. In some cases, virtual environment generator 110 may communicate with map database 108 to obtain map data for rendering the simulated real-world environment.

Figure 2:
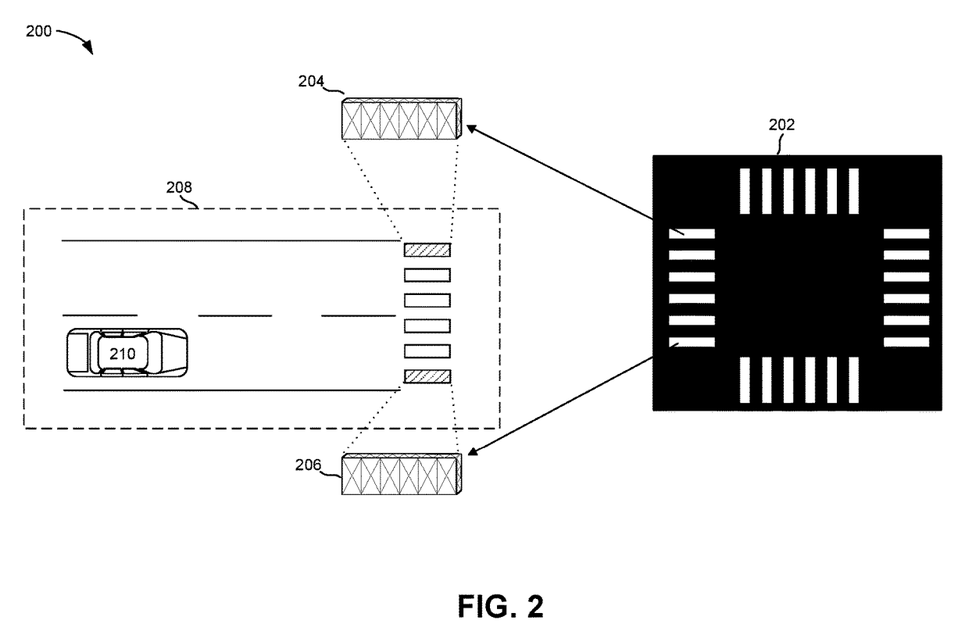
FIG. 2 illustrates a conceptual diagram of generating simulation road paint geometry for importing to a virtual environment, according to some aspects of the disclosed technology.

FIG. 2 illustrates a conceptual diagram 200 for generating simulation road paint geometry for importing to a virtual environment. In some cases, road paint geometry can be generated by using images of roads that include images of road paint. For example, as illustrated in conceptual diagram 200, image 202 can correspond to image data for an intersection that includes road paint imaging associated with four crosswalks. In some cases, image 202 may be captured by a sensor such as a camera or a LIDAR. In some aspects, image 202 may be captured by an autonomous vehicle configured with one or more sensors.

In some embodiments, image 202 can be processed to detect the location of road paint. For instance, road paint mesh generator 106 can process image 202 to identify pixels corresponding to road paint. In some aspects, road paint mesh generator 106 can generate road paint mesh objects corresponding to the road paint from image 202. For instance, road paint mesh generator 106 can generate road paint mesh object 204 and road paint mesh object 206, each corresponding to an image of a crosswalk stripe in image 202.

In some aspects, road paint mesh object 204 and road paint mesh object 206 can be used to simulate road paint in a virtual environment. For example, road paint mesh object 204 and road paint mesh object 206 can be used to simulate road paint within virtual environment 208. In some cases, road paint mesh object 204 and road paint mesh object 206 can be rendered on top of a road in virtual environment 208 (e.g., to simulate road paint thickness). In some cases, virtual environment 208 can be used to test the operation of a simulated autonomous vehicle 210.

Figure 3:
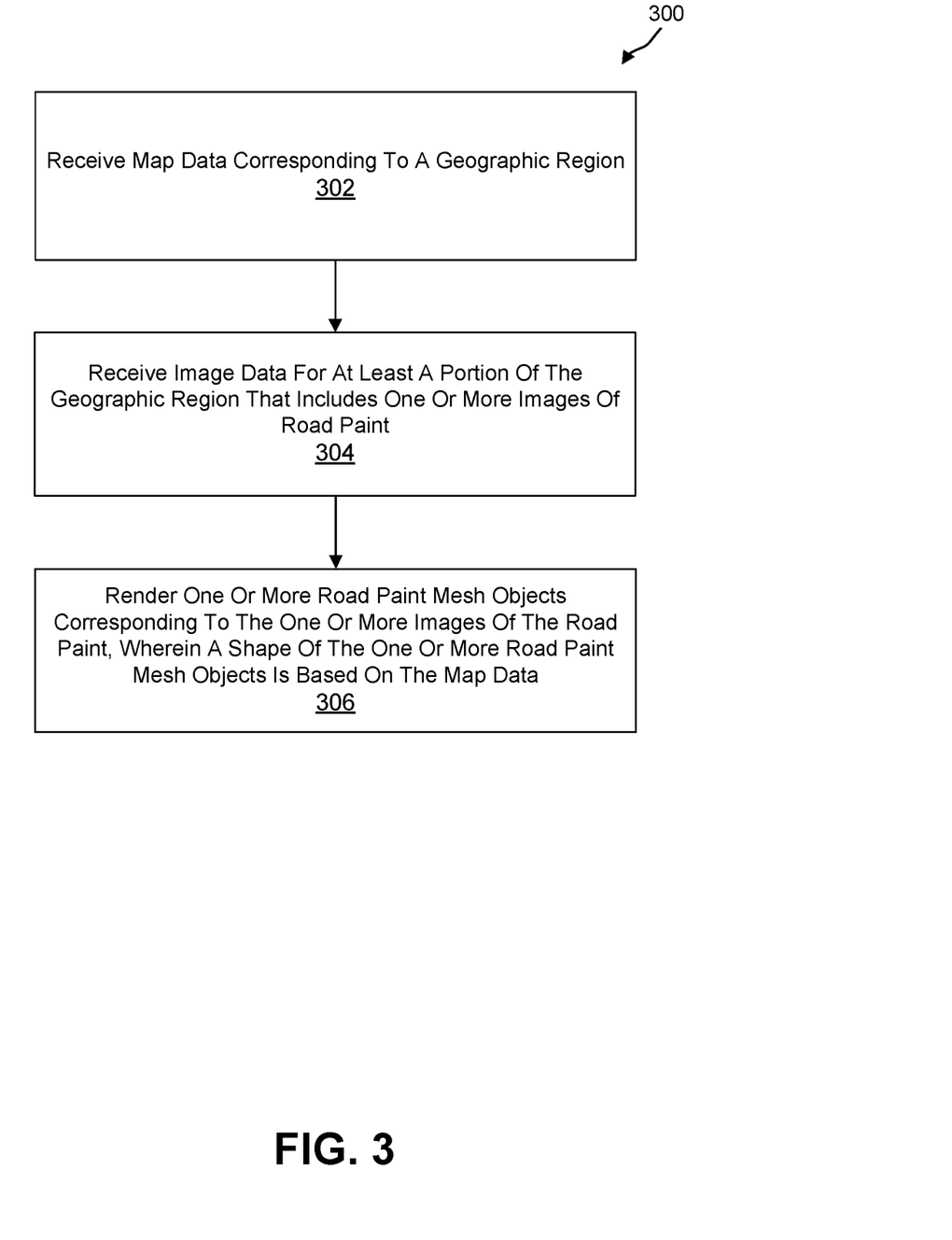
FIG. 3 illustrates a block diagram of an example process for using real-world road paint imaging to generate road paint geometry for a virtual environment, according to some aspects of the disclosed technology.

FIG. 3 illustrates a block diagram of an example process 300 for using real-world road paint imaging to generate road paint geometry for a virtual environment. At block 302, process 300 includes receiving map data corresponding to a geographic region. For example, road paint mesh generator 106 can obtain map data from map database 108 that corresponds to a geographic region (e.g., Los Angeles, San Francisco, etc.).

At block 304, process 300 includes receiving image data for at least a portion of the geographic region that includes one or more images of road paint. For instance, road paint mesh generator 106 can obtain (e.g., receive or request) image data from image database 104 that corresponds to at least a portion of the geographic region and includes images of road paint. In some cases, the image data can be based on at least one of camera sensor data and light detection and ranging (LIDAR) sensor data. For example, image database 104 can store image data received from image acquisition 102 (e.g., based on camera sensor data or LIDAR data).

At block 306, process 300 includes rendering one or more road paint mesh objects corresponding to the one or more images of the road paint, wherein a shape of the one or more road paint mesh objects is based on the map data. For example, road paint mesh generator 106 can render one or more road paint mesh objects that can correspond to the one or more images of the road paint. In some cases, the shape of the road paint mesh objects can be based on the map data for the geographic region (e.g., topography data, location data, etc.).

In some cases, the one or more road paint mesh objects can be associated with an elevation metric for simulating a road paint thickness. For instance, road paint mesh generator 106 can generate road paint mesh objects having a height or elevation metric that can be used to mimic the thickness of road paint as applied to the road (e.g., on asphalt). In some aspects, each of the one or more road paint mesh objects can include a plurality of vertices having a respective position that is based on the map data. For example, road paint mesh generator may generate a road paint mesh object (e.g., road paint mesh object 204 that can include a plurality of vertices that are associated with map coordinates (e.g., based on map data from map database 108). In some cases, the coordinates corresponding to the vertices can be used to position the road paint mesh objects within a virtual environment (e.g., virtual environment 208).

In some aspects, process 300 can include rasterizing the image data to identify the one or more images of the road paint. For instance, road paint mesh generator 106 can rasterize image data from image database 104 to identify images of road paint.

In some embodiments, process 300 can include generating a virtual environment corresponding to the geographic region that includes the one or more road paint mesh objects. For example, virtual environment generator 110 can generate a virtual or simulated environment corresponding to the geographic region that can include the one or more road paint mesh objects from road paint mesh generator 106.

In some cases, process 300 can include adjusting a color intensity associated with at least one road paint mesh object from the one or more road paint mesh objects, wherein the color intensity is based on a number of polygons included in the at least one road paint mesh object. For example, road paint mesh generator 106 can adjust the color intensity of a road paint mesh object. In some aspects, the color intensity can be adjusted to simulate effects of aging of road paint (e.g., fading, lightening, sullied, etc.).

Figure 4:
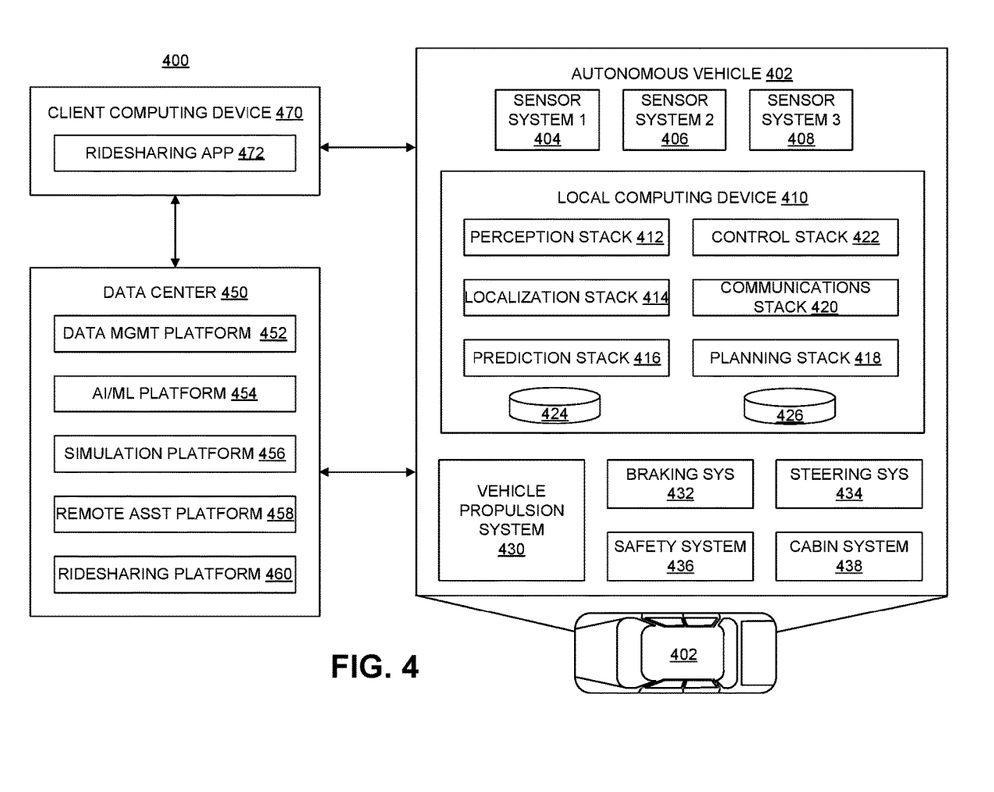
FIG. 4 illustrates an example system environment that can be used to facilitate AV dispatch and operations, according to some aspects of the disclosed technology.

FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some embodiments, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematics of the object (information about its movement), a tracked path of the object, and a description of the pose of the object (its orientation or heading, etc.).

The mapping and localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some embodiments, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some embodiments, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 426 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ridesharing platform 460, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the cartography platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the cartography platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the cartography platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Figure 5:
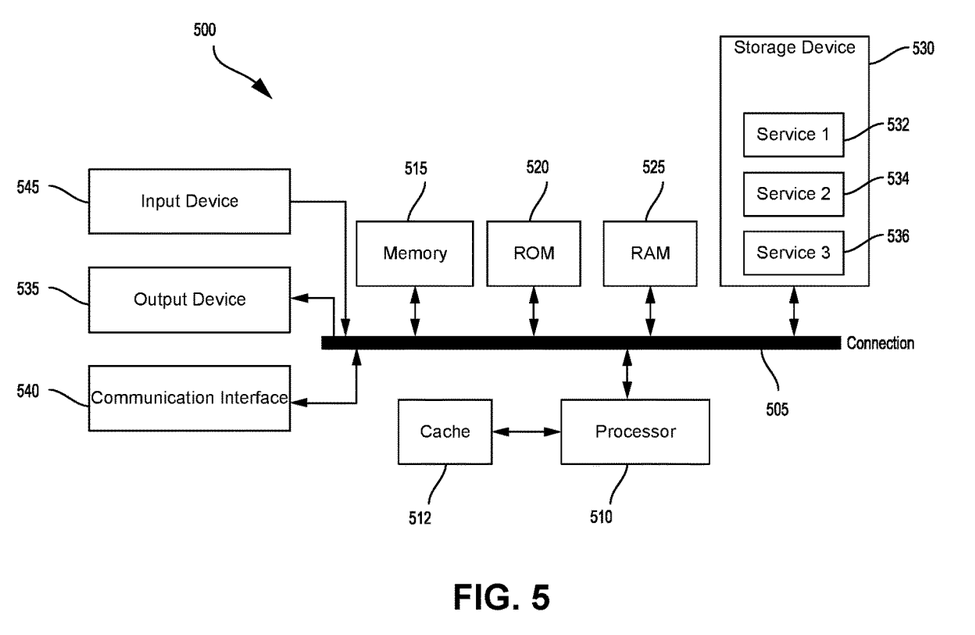
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system comprising:
    one or more processors; and
    a computer-readable storage medium coupled to the one or more processors, wherein the computer-readable storage medium comprises instructions that are configured to cause the one or more processors to perform operations comprising:
    receive map data corresponding to a geographic region, wherein the map data includes a topography of the geographic region;
    receive image data for at least a portion of the geographic region that includes one or more images of road paint;
    generate a virtual environment corresponding to the geographic region, wherein the virtual environment is configured to simulate performance of an autonomous vehicle (AV) within the geographic region;
    render, within the virtual environment, one or more road paint mesh objects simulating real-world road paint based on the one or more images of the road paint, wherein a shape of the one or more road paint mesh objects is based on the topography of the geographic region; and
    simulate, within the virtual environment, AV sensor data based on the one or more road paint mesh objects.

2. The system of claim 1, the computer-readable storage medium storing instructions which, when executed by the one or more processors, cause the one or more processors to:
    rasterize the image data to identify the one or more images of the road paint.

3. The system of claim 1, wherein each of the one or more road paint mesh objects is associated with an elevation metric for simulating a road paint thickness.

4. The system of claim 1, wherein the image data is based on at least one of camera sensor data and light detection and ranging (LiDAR) sensor data.

5. The system of claim 1, wherein each of the one or more road paint mesh objects includes a plurality of vertices having a respective position that is based on the map data.

6. The system of claim 1, the computer-readable storage medium storing instructions which, when executed by the one or more processors, cause the one or more processors to:
    render the one or more road paint mesh objects as a three-dimensional (3D) mesh comprising a plurality of polygons; and
    adjust a color intensity associated with at least one road paint mesh object from the one or more road paint mesh objects, wherein the color intensity is adjusted to simulate effects of aging of road paint, including simulating fading, lightening, sullying or a feathering of the road paint.

7. The system of claim 1, the computer-readable storage medium storing instructions which, when executed by the one or more processors, cause the one or more processors to:
    identify a portion of the image data corresponding to the one or more images of road paint based on one or more intensity values corresponding to one or more pixels in the portion of the image data.

8. A computer-implemented method, comprising:
    receiving map data corresponding to a geographic region, wherein the map data includes a topography of the geographic region;
    receiving image data for at least a portion of the geographic region that includes one or more images of road paint;
    generating a virtual environment corresponding to the geographic region, wherein the virtual environment is configured to simulate performance of an autonomous vehicle (AV) within the geographic region;
    rendering, within the virtual environment, one or more road paint mesh objects that simulate real-world road paint based on the one or more images of the road paint, wherein a shape of the one or more road paint mesh objects is based on the topography of the geographic region; and
    simulating, within the virtual environment, AV sensor data based on the one or more road paint mesh objects.

9. The computer-implemented method of claim 8, further comprising:
    rasterizing the image data to identify the one or more images of the road paint.

10. The computer-implemented method of claim 8, wherein each of the one or more road paint mesh objects is associated with an elevation metric for simulating a road paint thickness.

11. The computer-implemented method of claim 8, wherein the image data is based on at least one of camera sensor data and light detection and ranging (LiDAR) sensor data.

12. The computer-implemented method of claim 8, wherein each of the one or more road paint mesh objects includes a plurality of vertices having a respective position that is based on the map data.

13. The computer-implemented method of claim 8, further comprising:
    render the one or more road paint mesh objects as a three-dimensional (3D) mesh comprising a plurality of polygons; and
    adjusting a color intensity associated with at least one road paint mesh object from the one or more road paint mesh objects, wherein the color intensity is adjusted to simulate effects of aging of road paint, including simulating fading, lightening, sullying or a feathering of the road paint.

14. The computer-implemented method of claim 8, further comprising:
    identifying a portion of the image data corresponding to the one or more images of road paint based on one or more intensity values corresponding to one or more pixels in the portion of the image data.

15. A non-transitory computer-readable storage medium comprising instructions stored therein, which when executed by one or more processors, cause the one or more processors to perform operations comprising:
    receive map data corresponding to a geographic region, wherein the map data includes a topography of the geographic region;
    receive image data for at least a portion of the geographic region that includes one or more images of road paint;
    generate a virtual environment corresponding to the geographic region, wherein the virtual environment is configured to simulate performance of an autonomous vehicle (AV) within the geographic region;
    render, within the virtual environment, one or more road paint mesh objects simulating real-world road paint based on the one or more images of the road paint, wherein a shape of the one or more road paint mesh objects is based on the topography of the geographic region; and
    simulate, within the virtual environment, AV sensor data based on the one or more road paint mesh objects.

16. The non-transitory computer-readable storage medium of claim 15, comprising instructions which, when executed by the one or more processors, cause the one or more processors to perform operations comprising:
    rasterize the image data to identify the one or more images of the road paint.

17. The non-transitory computer-readable storage medium of claim 15, wherein each of the one or more road paint mesh objects is associated with an elevation metric for simulating a road paint thickness.

18. The non-transitory computer-readable storage medium of claim 15, wherein the image data is based on at least one of camera sensor data and light detection and ranging (LiDAR) sensor data.

19. The non-transitory computer-readable storage medium of claim 15, wherein each of the one or more road paint mesh objects includes a plurality of vertices having a respective position that is based on the map data.

20. The non-transitory computer-readable storage medium of claim 15, comprising instructions which, when executed by the one or more processors, cause the one or more processors to perform operations comprising:
    identify a portion of the image data corresponding to the one or more images of road paint based on one or more intensity values corresponding to one or more pixels in the portion of the image data.

\* \* \* \* \*